United States Patent [19]

Willis et al.

[11] 4,140,134

[45] Feb. 20, 1979

[54] FLAVORING COMPOSITIONS CONTAINING DIALKYL-α, β-DIACYL SUCCINATES

[75] Inventors: Brian J. Willis, Bergenfield, N.J.; Frank Fischetti, Jr., Flushing; Robert G. Eilerman, Hempstead, both of N.Y.

[73] Assignee: Fritzsche Dodge & Olcott Inc., New York, N.Y.

[21] Appl. No.: 698,741

[22] Filed: Jun. 22, 1976

Related U.S. Application Data

[63] Continuation-in-part of Ser. No. 602,301, Aug. 6, 1975, abandoned.

[51] Int. Cl.$^2$ .......................... A24B 3/12; A24D 1/18
[52] U.S. Cl. ...................................... 131/2; 131/17 R; 131/144; 426/534; 426/538
[58] Field of Search ........................ 131/144, 2, 17, 15

[56] References Cited

PUBLICATIONS

*Perfume and Flavor Chemicals* vol. II, by Stephen Arctander Published by the author 1969.
*Tobacco Flavoring for Smoking Products* by Leffing Well et al., Published by R. J. Reynolds Tobacco Co. 1972, p. 27 cited.

*Primary Examiner*—Robert W. Michell
*Assistant Examiner*—V. Millin
*Attorney, Agent, or Firm*—Frank M. Nolan

[57] ABSTRACT

The flavor compositions of this invention include certain dialkyl-α,β-diacyl succinates which significantly enhance the flavor component or components of flavor compositions. For example, butterscotch flavors are materially improved in smoothness and certain fruit flavors are given greater richness and ripeness.

11 Claims, No Drawings

FLAVORING COMPOSITIONS CONTAINING DIALKYL-α, β-DIACYL SUCCINATES

This application is a continuation-in-part of U.S. patent application Ser. No. 602,301 of Willis et al., filed Aug. 6, 1975 now abandoned.

This invention relates to flavor compositions and more particularly to flavor compositions containing certain dialkyl-α,β-diacyl succinates.

It is well known that synthetic flavor enhancers such as Maltol, Ethyl Maltol, and 4-hydroxy-2,5-dimethyl-3(2H)-furanone are useful as flavor enhancers. However, such flavor enhancers are very expensive and increase the cost of products in which they are used.

In accordance with this invention, dialkyl-α,β-diacyl succinates are added to flavor components to impart significantly enhanced flavors to a wide variety of flavor components. For example, butterscotch flavors are materially improved in smoothness. Strawberry flavors are given a striking freshness. Banana flavors are rounded out to give the flavor of a ripe banana. When added to smoking tobacco or synthetic tobacco, the resulting product is increased in sweetness, the taste of the smoke is softened and the flow of saliva is increased, which lessens dryness of the mouth during smoking. When added to cough syrups containing theophylline, the flavor enhancers of this invention cover up the bitter taste. These flavor enhancers can also be used to replace part of the sugar content of a wide variety of sweetened beverages and foods, producing excellent flavor at lower cost.

The dialkyl-α,β-diacyl succinates employed in the flavor compositions of this invention have the formula:

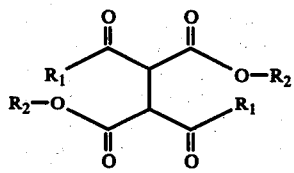

in which $R_1$ is a straight or branched chain alkyl having less than 6 carbon atoms and $R_2$ is a straight or branched chain alkyl having less than 7 carbon atoms, cyclopentyl or cyclohexyl.

Examples of $R_1$ are methyl, ethyl, propyl, isopropyl, butyl, isobutyl, amyl or isoamyl.

Examples of $R_2$ are methyl, ethyl, propyl, isopropyl, butyl, isobutyl, amyl, isoamyl, hexyl or isohexyl.

$R_1$ and $R_2$ may be the same or different.

When $R_2$ is ethyl or methyl, the succinate is prepared by the method described by M. S. Newman and J. S. Cella, *J. Org. Chem.* 38, 3482 (1973). When $R_2$ is other than ethyl or methyl, and $R_1$ is other than methyl, the procedure is the same except that the appropriate β-ketoesters are used instead of the acetoacetic esters.

The flavor compositions of this invention comprise at least 0.0025% by weight of a dialkyl-α,β-diacyl succinate. The total amount of dialkyl-α,β-diacyl succinate or succinates may vary within wide ranges such as 0.0001% to 30% by weight. More advantageously the range may be between 0.001% and 20% by weight of the flavor composition and preferably between 0.0025% and 5% by weight of the flavor composition.

Examples of flavor components of the flavor compositions of this invention are flavor mixtures per se such as pineapple, butterscotch, banana, and strawberry; foodstuffs such as meats, protein sources, fruits, cereals and other comestibles; beverages such as soft drinks, wines, alcoholic drinks, carbonated beverages; smoking tobacco; liquid medicaments such as cough syrups; and sugar substitutes in a wide range of edible or drinkable products.

A more comprehensive understanding of this invention is obtained from the following examples. Examples I and II show compositions produced with two levels of concentration of the dialkyl-α,β-diacyl succinate employed.

EXAMPLE I

PINEAPPLE FLAVOR COMPOSITIONS

| | Parts by Weight | Parts by Weight |
|---|---|---|
| Allyl cyclohexane propionate | 1.4 | 1.4 |
| Geranyl propionate | 0.5 | 0.5 |
| Allyl caproate | 13.0 | 13.0 |
| Ethyl iso valerate | 1.0 | 1.0 |
| Ethyl butyrate | 1.0 | 1.0 |
| Vanillin | 0.5 | 0.5 |
| Oil orange | 1.0 | 1.0 |
| Maltol | 2.0 | 2.0 |
| Diethyl-α,β-diacetyl succinate | 20.0 | 2.5 |
| Ethyl alcohol 95% | 46.0 | 46.0 |
| Propylene glycol | 13.6 | 31.1 |
| | 100.0 | 100.0 |

EXAMPLE II

STRAWBERRY FLAVOR COMPOSITIONS

| | Parts by Weight | Parts by Weight |
|---|---|---|
| Methoxy phenyl butanone | 1.0 | 1.0 |
| Ethyl butyrate | 6.0 | 6.0 |
| Ethyl iso valerate | 2.0 | 2.0 |
| Benzyl butyrate | 1.5 | 1.5 |
| Benzyl iso valerate | 0.5 | 0.5 |
| cis-3-Hexenol | 3.0 | 3.0 |
| Isobutyric acid | 1.5 | 1.5 |
| Diacetyl | 0.2 | 0.2 |
| Butyl phenyl acetate | 0.4 | 0.4 |
| Acetaldehyde 50% in ethanol | 0.2 | 0.2 |
| Benzyl dipropyl ketone | 0.2 | 0.2 |
| 2-Heptanone | 0.1 | 0.1 |
| Ethyl methyl phenyl glycidate | 2.4 | 2.4 |
| Diethyl-α,β-diacetyl succinate | 30.0 | 5.0 |
| Propylene glycol | 51.0 | 51.0 |
| Benzyl alcohol | — | 25.00 |
| | 100.0 | 100.0 |

EXAMPLE III

BUTTERSCOTCH FLAVOR COMPOSITION

| | Parts by Weight |
|---|---|
| Diethyl-α,β-diacetyl succinnate | 1.0 |
| Butyl butyrolactate | 4.0 |
| Diacetyl | 0.2 |
| Ethyl oleate | 2.0 |
| Ethyl myristate | 0.5 |
| Vanillin | 1.5 |
| Acetoin | 0.3 |
| Phenyl ethanol | 0.2 |
| Butyric acid | 0.1 |
| Ethyl oxyhydrate | 0.1 |
| Ethyl maltol | 3.0 |
| ΔDecalactone | 0.3 |
| γ-Nonalactone | 0.1 |
| Tincture foenugreek | 0.4 |
| Methyl cyclopenten-ol-one | 0.1 |
| Benzyl alcohol | 26.0 |
| Propylene glycol | 60.2 |
| | 100.0 |

EXAMPLE IV

BANANA FLAVOR COMPOSITION

| | Parts by Weight |
|---|---|
| Iso amyl acetate | 12.0 |
| Iso amyl butyrate | 10.0 |
| Benzyl butyrate | 3.0 |
| Iso amyl iso valerate | 2.0 |
| Ethyl butyrate | 3.0 |
| Butyric acid | 1.5 |
| Oil lemon | 2.5 |
| Vanillin | 2.0 |
| Ethyl maltol | 0.5 |
| γ-Undecalactone | 0.4 |
| 4-(p-Hydroxyphenyl)-2-butanone | 0.1 |
| Diethyl-α,β-diacetyl succinate | 10.0 |
| Propylene glycol | 53.0 |
| | 100.0 |

EXAMPLE V

PINEAPPLE FLAVOR

| | Parts by Weight Formulas Nos. | | | |
|---|---|---|---|---|
| | VA | VB | VC | VD |
| Allyl Cyclohexane Propionate | 1.4 | 1.4 | 1.4 | 1.4 |
| Geranyl Propionate | 0.5 | 0.5 | 0.5 | 0.5 |
| Allyl Caproate | 13.0 | 13.0 | 13.0 | 13.0 |
| Ethyl Iso Valerate | 1.0 | 1.0 | 1.0 | 1.0 |
| Ethyl Butyrate | 1.0 | 1.0 | 1.0 | 1.0 |
| Vanillin | 0.5 | 0.5 | 0.5 | 0.5 |
| Oil Orange | 1.0 | 1.0 | 1.0 | 1.0 |
| Maltol | 2.0 | 2.0 | — | — |
| Diethyl-α,β-Diacetyl Succinate | 20.0 | 2.5 | 20.0 | 2.5 |
| Ethyl Alcohol 95% | 46.0 | 46.0 | 46.0 | 46.0 |
| Propylene Glycol | 13.6 | 31.1 | 15.6 | 33.1 |
| | 100.0 | 100.0 | 100.0 | 100.0 |

Formulas VA and VB contain Maltol in addition to diethyl-α,β-diacetyl succinate, while Formulas VC and VD contain only diethyl-α,β-diacetyl succinate as a complete replacement for Maltol. The pienapple flavor achieved by the use of Formula VC is comparable if not superior to the flavor of Formula VA, while the flavor achieved by the use of Formula VD is comparable if not superior to the flavor of VB. The replacement proportion of Maltol by diethyl-α,β-diacetyl succinate is approximately one part by weight to one part by weight of the Maltol.

EXAMPLE VI

WINE FLAVOR COMPOSITION

The wine flavor composition is produced by initially adding 0.08 parts by weight of diethyl-α,β-diacetyl succinate to 99.92 parts by weight of natural wine flavor. Four liquid ounces of the wine concentrate was added to one gallon of wine.

A wine flavor composition may also be produced by preparing a 1% by weight ethanol solution of diethyl-α,β-diacetyl succinate and then adding 0.32 fluid ounces of the solution to 1 gallon of wine. This is equivalent to 25 parts per million.

EXAMPLE VII

TOBACCO FLAVOR COMPOSITION

A 1% ethanol solution of diethyl-α,β-diacetyl succinate is sprayed on smoking tobacco at the rate of 4 ounces of solution per 100 pounds of tobacco. After the alcohol is allowed to evaporate, a tobacco flavor composition results.

To produce a flavored tobacco which also contains synthetic tobacco, the procedure for the production of tobacco flavor composition heretofore described in this Example is repeated except that instead of employing smoking tobacco only, synthetic tobacco such as cellulose fibers, for example, the cellulose fibers sold by the Celanese Chemical Company under the trademark "CYTREL" or the cellulose fibers sold by Imperial Chemical Corporation under the trademark "POLYSTREP", is blended with the flavored tobacco in a ratio of approximately 1 to 1 by weight.

In a third procedure, a 1% ethanol soulution of diethyl-α,β-diacetyl succinate is sprayed on synthetic tobacco, such as cellulose fibers, at the rate of 4 ounces of soultion to 100 pounds of synthetic tobacco. After the alcohol is allowed to evaporate, a tobacco flavor synthetic composition results.

Any one of the above tobacco flavor compositions may be used in cigarettes, producing a striking improvement in flavor.

For the treatment of tobacco, it is desirable that the flavor enhancer be in solubilized form, such as in an ethanol solution, as in the example of diethyl-α,β-diacetyl succinate.

EXAMPLE VIII

CARBONATED SOFT DRINKS

A fruit flavor carbonated drink is produced by dissolving one ounce by weight of one of the flavor compositions such as described in Examples I or II in one gallon of sugar syrup. One ounce of the resulting mixture is added to about five ounces of carbonated water to produce six ounces of carbonated beverage. The flavor composition containing 2.5% by weight of diethyl-α,β-diacetyl succinate results in a level of 32 parts per million of the diethyl-α,β-diacetyl succinate flavor enhancer in the total carbonated drink produced.

In Examples I through IX, dimethyl-α,β-diacetyl succinate may be utilized as the flavor enhancer in the same amounts indicated for diethyl-α,β-diacetyl succinate used in those Examples.

EXAMPLE IX

BUTTERSCOTCH FLAVOR COMPOSITION

Two butterscotch compositions each containing a different flavor enhancer in accordance with the teaching of the invention were prepared. For comparison, another composition containing the same ingredients but without either of the flavor enchancers used in A and B was also prepared as a control. The formulas of the compositions are as follows:

| | Parts by Weight (Control) | Parts by Weight (A) | Parts by Weight (B) |
|---|---|---|---|
| Butyl Butyrolactate | 4.0 | 4.0 | 4.0 |
| Diacetyl | 0.2 | 0.2 | 0.2 |
| Ethyl Oleate | 2.0 | 2.0 | 2.0 |
| Ethyl Myristate | 0.5 | 0.5 | 0.5 |
| Vanillin | 1.5 | 1.5 | 1.5 |
| Acetyl Methyl Carbinol | 0.3 | 0.3 | 0.3 |
| Phenyl Ethyl Alcohol | 0.2 | 0.2 | 0.2 |
| Butyric Acid | 0.1 | 0.1 | 0.1 |
| Ethyl Propionate | 0.1 | 0.1 | 0.1 |
| Ethyl Maltol | 3.0 | 3.0 | 3.0 |
| Δ-Decalactone | 0.3 | 0.3 | 0.3 |
| γ-Nonalactone | 0.1 | 0.1 | 0.1 |
| Methyl Para-Tertiary Butyl Phenylacetate (in 1% alcohol) | 0.1 | 0.1 | 0.1 |

| | Parts by Weight (Control) | Parts by Weight (A) | Parts by Weight (B) |
|---|---|---|---|
| Tincture Foenugreek | 0.4 | 0.4 | 0.4 |
| Cyclotene | 0.1 | 0.1 | 0.1 |
| Benzyl Alcohol | 27.1 | 27.1 | 27.1 |
| Propylene Glycol | 60.0 | 57.0 | 57.0 |
| Diethyl-α,β-Dipropionyl Succinate | — | — | 3.0 |
| Dicyclohexyl-α,β-Diacetyl Succinate | — | 3.0 | — |
| | 100.0 | 100.0 | 100.0 |

Each of the butterscotch compositions containing the flavor enchancers (A) and (B) had an immeasurably superior flavor over the control. The butterscotch compositions (A) and (B) had a better butterscotch caramel flavor and an increased sweetness and mouth feel. The butter notes were also enhanced.

What is claimed is:

1. A smoking composition comprising a smoking material and at least 0.0001% by weight of a dialkyl-α,β-diacyl succinate having the formula:

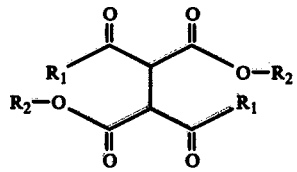

in which $R_1$ is a straight or branched chain alkyl having less than 6 carbon atoms and $R_2$ is a straight or branched chain alkyl having less than 7 carbon atoms, cyclopentyl or cyclohexyl.

2. A smoking composition of claim 1 in which the dialkyl-α,β-diacyl succinate is dimethyl-α,β-diacetyl succinate.

3. A smoking composition of claim 1 in which the dialkyl-α,β-diacyl succinate is diethyl-α,β-diacetyl succinate.

4. A smoking composition of claim 1 in which the dialkyl-α,β-diacyl succinate present in 0.0001% to 30% by weight of the composition.

5. A smoking composition of claim 1 in which the dialkyl-α,β-diacyl succinate present is 0.001% to 20% by weight of the composition.

6. A smoking composition of claim 1 in which the dialkyl-α,β-diacyl succinate present is 0.0025% to 5% by weight of the composition.

7. A smoking composition of claim 1 in which the smoking material is natural smoking tobacco.

8. A smoking composition of claim 1 in which the smoking material is synthetic smoking tobacco.

9. A smoking composition of claim 1 in which the dialkyl-α,β-diacyl succinate is diethyl-α,β-dipropionyl succinate.

10. A smoking composition of claim 1 in which the dialkyl-α,β-diacyl succinate is dicyclohexyl-α,β-diacetyl succinate.

11. A smoking composition of claim 1 in which the smoking material is a mixture of natural smoking tobacco and synthetic smoking tobacco.

* * * * *